United States Patent [19]
Osborne et al.

[11] Patent Number: 6,139,213
[45] Date of Patent: Oct. 31, 2000

[54] CLAMP ASSEMBLY FOR DRIVE BAY SUPPORT

[75] Inventors: Jon Richard Osborne, Wauseon; Conrad A. H. Jelinger, Toledo, both of Ohio

[73] Assignee: Unitrend, Inc., Toledo, Ohio

[21] Appl. No.: 09/141,219

[22] Filed: Aug. 27, 1998

[51] Int. Cl.[7] .................................................. F16B 21/06
[52] U.S. Cl. ..................... 403/322.4; 403/338; 361/726
[58] Field of Search .................................. 403/338, 335, 403/373, 374.5, 322.4, 321; 292/97, 100, DIG. 49, 113; 361/679, 684, 685, 683, 724, 726

[56] References Cited

U.S. PATENT DOCUMENTS

| | | | |
|---|---|---|---|
| 1,827,369 | 10/1931 | Naylor | 292/100 |
| 3,625,548 | 12/1971 | Boehm | 403/322.4 |
| 4,008,584 | 2/1977 | Wingert | 292/DIG. 49 |
| 4,540,206 | 9/1985 | Frame et al. | 292/66 |
| 4,804,215 | 2/1989 | Bisbing | 292/DIG. 49 |
| 4,828,298 | 5/1989 | Bisbing | 292/DIG. 49 |
| 5,127,684 | 7/1992 | Klotz et al. | 292/113 |

*Primary Examiner*—Lynne H. Browne
*Assistant Examiner*—Kenneth Thompson
*Attorney, Agent, or Firm*—MacMillan, Sobanski & Todd, LLC

[57] ABSTRACT

A clamp assembly for removably attaching a drive bay support to a main computer chassis. The clamp assembly includes a clamp support having a hook portion and at least one clamp link for pivotally attaching the clamp support to the drive bay support. The clamp asssembly is in a clamped position when the clamp assembly is pivoted about the drive bay support such that the hook portion of the clamp support engages a hook portion of the main chassis. The clamp assembly is in an unclamped position when the clamp assembly is pivoted about the drive bay support such that the hook portion of the clamp support does not engage the main chassis.

12 Claims, 2 Drawing Sheets

CLAMP ASSEMBLY FOR DRIVE BAY SUPPORT

BACKGROUND OF THE INVENTION

This invention relates in general to the mounting of hard drives into a computer, and in particular, to a clamp assembly for a drive bay support for mounting hard drives into a computer without the use of tools.

Currently, hard drives are mounted into a computer by using fasteners, typically screws, to attach the hard drives to the computer chassis. The use of screws provides a risk that the screw may fall into the computer causing electrical damage and/or injury to the technician.

Thus, it would be desirable to alleviate the risk of electrical damage to the computer and/or injury to the technician by providing a drive bay support that uses a clamp to secure the hard drives in the computer chassis without the need for tools.

SUMMARY OF THE INVENTION

This invention relates to a clamp assembly for removably attaching a drive bay support to a main computer chassis. The clamp assembly includes a clamp support having a hook portion, and at least one clamp link for pivotally attaching the clamp support to the drive bay support. The clamp asssembly is in a clamped position when the clamp assembly is pivoted about the drive bay support such that the hook portion of the clamp support engages a hook portion of the main chassis. The clamp assembly is in an unclamped position when the clamp assembly is pivoted about the drive bay support such that the hook portion of the clamp support does not engage the main chassis. In this manner, the drive bay support can be removably attached to the main chassis without the need for tools and without the risk of electrical damage to the computer and/or injury to the technician.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
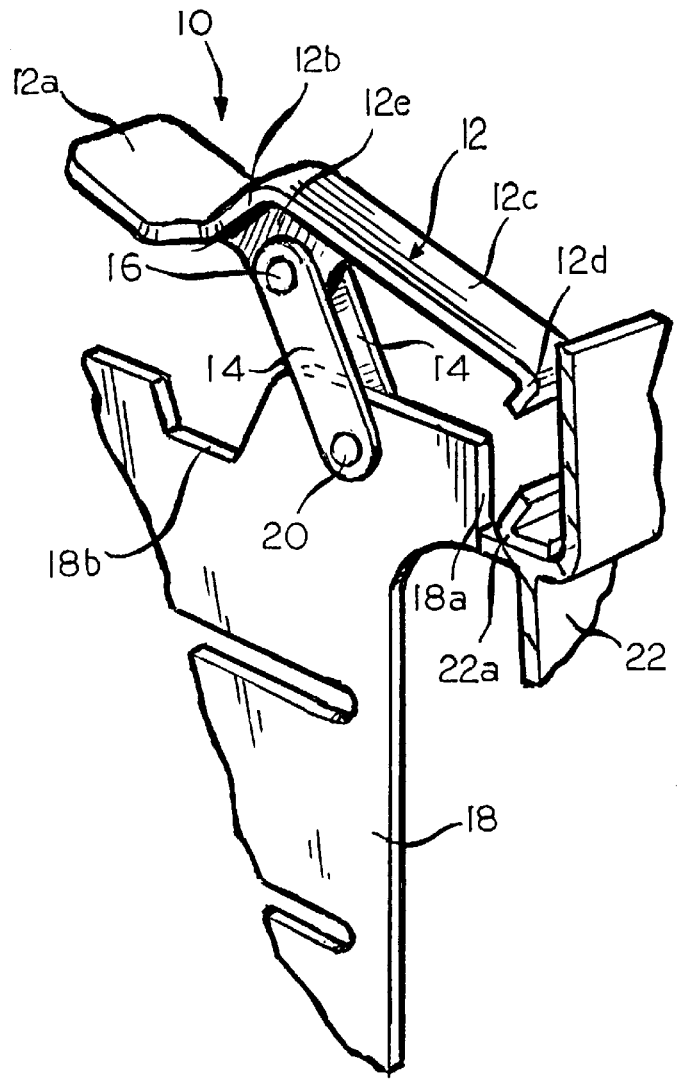
FIG. 1 is a partial cutaway side perspective view of the clamp assembly according to a preferred embodiment of the invention when in an unclamped position.

Referring now to the drawings, there is illustrated a clamp assembly, generally shown at 10, according to a preferred embodiment of the invention. As shown in FIG. 1, the clamp assembly 10 is in an unclamped position. The clamp assembly 10 includes a support clamp 12 and a pair of support links 14. One end of each support link 14 is pivotally connected to the support clamp 12 by using a rivet 16. The other end of each support link 14 is also pivotally connected to a drive bay support 18 by using a rivet 20. The clamp assembly 10 is used to clamp the drive bay support to a main chassis 22 that is part of a reconfigurable modular computer assembly. The reconfigurable modular computer assembly, including a description of the drive bay support 18, is more fully described in U.S. patent application Ser. No. 08/969,874, filed Nov. 14, 1997, herein incorporated by reference.

The support clamp 12 includes a tab portion 12a, an inclined portion 12b, a bridge portion 12c, a hook portion 12d, and a web portion 12e. Preferably the support clamp 12 is made of any suitable synthetic resinous plastic material, such as DELRIN® 500P, and the like. The DELRIN® 500P material can be commercially purchased from E. I. Du Pont De Nemours, Wilmington, Del. In the preferred embodiment, the support clamp 12 has a wall thickness of approximately 0.090 inches.

The tab portion 12a is located at one end of the support clamp 12 and allows the user to place the clamp assembly 10 in the clamped or unclamped position, as described below. In the preferred embodiment, the tab portion 12a is substantially flat and has a width of approximately 0.50 inches and a length of approximately 0.95 inches.

Figure 3:
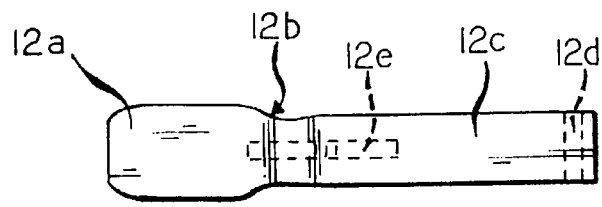
FIG. 3 is a top view of the support clamp of the invention.

As best seen in FIG. 3, the inclined portion 12b is diposed between the tab portion 12a and the bridge portion 12c. The inclined portion 12b is preferably at an angle, $\alpha_1$, of approximately 20 degrees with respect to the vertical axis. Preferably, the width of the inclined portion 12b tapers or decreases from approximately 0.50 inches at the tab portion 12a to approximately 0.375 inches at the bridge portion 12c. The length of the inclined portion is approximately 0.188 inches.

The bridge portion 12c is disposed between the inclined portion 12b and the hook portion 12d of the support clamp 12. In the preferred embodiment, the bridge portion 12c is substantially flat and has a width of approximately 0.375 inches and a length of approximately 1.375 inches.

The hook portion 12d is located at the other end of the support clamp 12. The hook portion 12d is at an angle, $\alpha_2$, of approximately 30 degrees with respect to the vertical axis. The hook portion 12d mates with a corresponding hook portion 22a of the main chassis 22 to securely fasten the drive bay support 18 to the main chassis 22 when the clamp assembly 10 is in the clamped position (FIG. 2).

Figure 2:
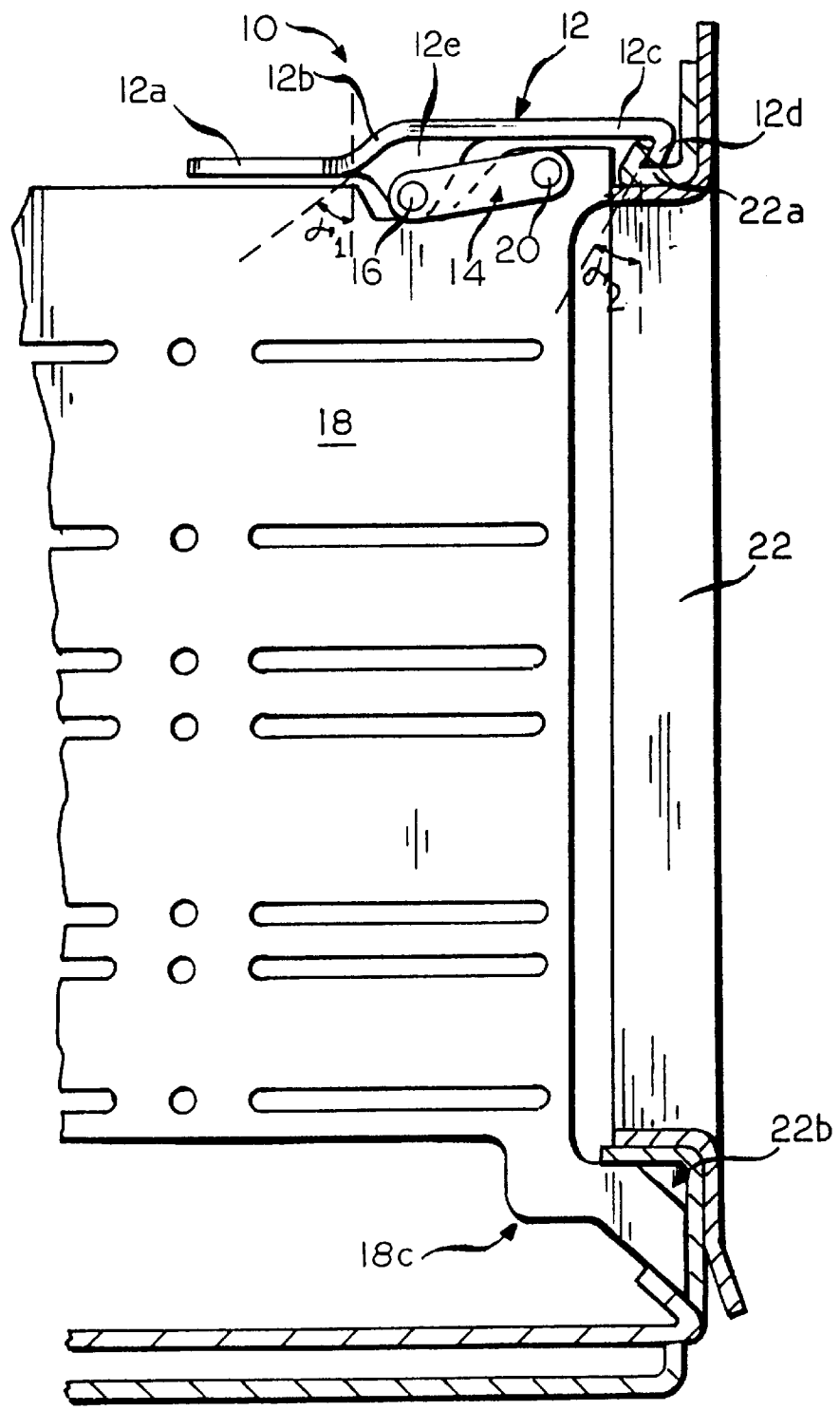
FIG. 2 is a partial cutaway side view of the clamp assembly when in a clamped position.

As best seen in FIG. 2, the web portion 12e is preferably located underneath the inclined portion 12b and one end of the bridge portion 12c of the support clamp 12. At this location, the web portion 12e provides structural support for the support clamp 12. In addition, the web portion 12e includes an opening for allowing the rivet 16 to pass through the web portion 12e and an opening located at one end of each support link 14, thereby pivotally connecting the support clamp 12 to each support link 14.

As best seen in FIG. 1, each support link is pivotally connected on each side of the web portion 12e of the support clamp 12 and on each side of the drive bay support 18. In the preferred embodiment, each support link 14 has a width of approximately 0.25 inches and a length of approximately 1.00 inches. Each support link 14 is preferably made of the same material as the support clamp 12, that is, any suitable synthetic resinous plastic material, such as DELRIN® 500P, and the like. Preferably, each support link 14 has a wall thickness of approximately 0.090 inches.

An important design consideration of the invention are the dimensions of the support clamp 12 and each support link 14. Specifically, the length of the support clamp 12 is approximately 2.625 inches and the length of each support link 14 is approximately 1.000 inches. It should also be noted that in the preferred embodiment, the pivot pin 20 determining the pivot point for the support clamp 12 about the drive bay support 18 is located approximately 0.375 inches from the front surface 18a of the drive bay support 18. In this manner, the hook portion 12d of the clamp assembly 10 can engage the hook portion 22a of the main chassis 22 when the clamp assembly 10 is pivoted from the unclamped position, as shown in FIG. 1, to the clamped position, as shown in FIG. 2. However, it should be realized that the invention is not limited by the dimensions of the support clamp 12, the clamp links 14, the drive bay support 18, and the pivot pins 16, 20, and that the invention can be practiced with any suitable dimensions that will accommodate the dimensions for the reconfigurable modular computer assembly.

In order to removably attach the drive bay support 18 to the main chassis 22 of the computer without the need for tools, the user inserts an insertion tab 18c of the drive bay support 18 into a receiving slot 22b of the main chassis 22. At this point, the clamp assembly 10 is in the unclamped position as shown in FIG. 1. Then, the user moves the tab portion 12a of the support clamp 12 upward and toward the front of the main chassis 22 pivoting the clamp support 12 and the clamp links 14 about the pivot pins 16, 20 until the hook portion 12d of the clamp assembly 10 can engage the hook portion 22a of the main chassis 22. Next, the user moves the tab portion 12a downward and toward the rear of the main chassis 22 pivoting the clamp support 12 and the clamp links 14 about the pivot pins 16, 20 until the clamp assembly 10 is in the clamped position, as shown in FIG. 2. The drive bay support 18 may be provided with a recessed area 18b to allow the web portion 12e to be positioned within it when the clamp assembly 10 is in the clamped position.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A clamp assembly for removably attaching a drive bay support to a main chassis, comprising:
   a clamp support including a hook portion, a tab portion, a bridge portion, and an inclined portion disposed between the tab portion and the bridge portion; and
   at least one support link for pivotally attaching said clamp support to a drive bay support,
   wherein said clamp support further includes a web portion located underneath the inclined portion, said at least one support link being pivotally attached to the web portion of said clamp support, and
   wherein said clamp assembly is in a clamped position when the hook portion of said clamp support engages a hook portion of a main chassis, and
   wherein said clamp assembly is in an unclamped position when the hook portion of said clamp support does not engage the hook portion of the main chassis.

2. The clamp assembly according to claim 1, wherein said clamp support further includes a tab portion, a bridge portion, and an inclined portion disposed between the tab portion and the bridge portion.

3. The clamp assembly according to claim 2, wherein a width of the inclined portion decreases from the tab portion to the bridge portion.

4. The clamp assembly according to claim 2, wherein the inclined portion is at an angle, $\alpha_1$, of approximately 20 degrees with respect to a vertical axis of said clamp assembly.

5. The clamp assembly according to claim 1, wherein the hook portion of said clamp support is at an angle, $\alpha_2$, of approximately 30 degrees with respect to a vertical axis of said clamp assembly.

6. A clamp assembly, comprising:
   a drive bay support;
   a clamp support including a hook portion, a tab portion, a bridge portion, and an inclined portion disposed between the tab portion and the bridge portion; and
   at least one support link for pivotally attaching said clamp support to said drive bay support,
   wherein said clamp support further includes a web portion located underneath the inclined portion, said at least one support link being pivotally attached to the web portion of said clamp support, and
   wherein said clamp assembly is in a clamped position when the hook portion of said clamp support engages a hook portion of a main chassis, and
   wherein said clamp assembly is in an unclamped position when the hook portion of said clamp support does not engage the hook portion of the main chassis.

7. The clamp assembly according to claim 6, wherein a width of the inclined portion decreases from the tab portion to the bridge portion.

8. The clamp assembly according to claim 5, wherein the inclined portion is at an angle, $\alpha_1$, of approximately 20 degrees with respect to a vertical axis of said clamp assembly.

9. The clamp assembly according to claim 6, wherein the hook portion of said clamp support is at an angle, $\alpha_2$, of approximately 30 degrees with respect to a vertical axis of said clamp assembly.

10. A clamp assembly, comprising:
    a drive bay support;
    a clamp support including a hook portion, a tab portion, a bridge portion, and an inclined portion disposed between the tab portion and the bridge portion; and
    at least one support link for pivotally attaching said clamp support to a drive bay support,
    wherein the inclined portion is at an angle, $\alpha_1$, of approximately 20 degrees with respect to a vertical axis of said clamp assembly, and
    wherein said clamp assembly is in a clamped position when the hook portion of said clamp support engages a hook portion of a main chassis, and
    wherein said clamp assembly is in an unclamped position when the hook portion of said clamp support does not engage the hook portion of the main chassis.

11. The clamp assembly according to claim 10, wherein said clamp support further includes a web portion located underneath the inclined portion, said at least one clamp link being pivotally attached to the web portion of said clamp support.

12. The clamp assembly according to claim 10, wherein the hook portion of said clamp support is at an angle, $\alpha_2$, of approximately 30 degrees with respect to a vertical axis of said clamp assembly.

* * * * *